United States Patent [19]

Papazian et al.

[11] Patent Number: 5,512,806
[45] Date of Patent: Apr. 30, 1996

[54] DEVICE FOR CONTROLLING THE FUNCTION OF AN ELECTRIC STARTING MOTOR FOR A WINDSHIELD WIPER OF THE REAR WINDOW WHICH OPENS ON AN AUTOMOTIVE VEHICLE

[75] Inventors: Samuel Papazian, Chatellerault; Eric Douville, Colombes, both of France

[73] Assignee: Valeo Systemes D'Essuyage, Le Bretoneus, France

[21] Appl. No.: 170,118

[22] Filed: Dec. 17, 1993

[30] Foreign Application Priority Data

Nov. 24, 1993 [FR] France ..................................... 9215241
Nov. 24, 1993 [FR] France ..................................... 9215242

[51] Int. Cl.$^6$ ..................................................... H02P 1/00
[52] U.S. Cl. .......................... 318/277; 318/443; 318/444; 318/266; 15/250.17
[58] Field of Search .............................. 318/DIG. 2, 277, 318/443, 444, 266; 15/250.17

[56] References Cited

U.S. PATENT DOCUMENTS

| | | | |
|---|---|---|---|
| 3,733,532 | 5/1973 | Hill | 318/443 |
| 4,183,114 | 1/1980 | Eden | 15/250.17 |
| 4,852,205 | 8/1989 | Tanaka et al. | 15/250.17 |

OTHER PUBLICATIONS

Patent Abstracts of Japan–vol. 10, No. 265 (M–515)(2321) 10 Sep. 1986 & JP–A–61 89 153 (Nissan Motor) 7 May 1986.

Patent Abstracts of Japan–vol. 9, No. 238 (M–416)(1961) 25 Sep. 1985 & JP–Aα92 138 (Hino Jodasha Kogyo) 23 May 1985.

Patent Abstracts of Japan–vol. 8, No. 143 (M–306)(1580) 4 Jul. 1984 & JP–A–59 40 972 (Hino Jososha Kogyo) 6 Mar. 1984.

French Search Report 10/Sep. 1993.

*Primary Examiner*—William M. Shoop, Jr.
*Assistant Examiner*—Karen Masih
*Attorney, Agent, or Firm*—Morgan & Finnegan

[57] ABSTRACT

A device is described for controlling the operation of an electric motor for driving the arm of a windshield wiper of an opening window, particularly the rear window of an automotive vehicle. The device has a control unit for supplying power to the motor. The operation of the motor is controlled by a key contact of the vehicle and a control element. The key contact and the control element are under user control and are connected in series between a power supply source, the control unit, and a contact for detecting the opening or closing of the window. The device is further characterized in that the open window detection contact is connected to a control unit data input so that it controls restarting the motor only after opening and closing of window and only after reinitialization of the control element by interruption of the control element and by a new user action on the control element.

11 Claims, 3 Drawing Sheets

DEVICE FOR CONTROLLING THE FUNCTION OF AN ELECTRIC STARTING MOTOR FOR A WINDSHIELD WIPER OF THE REAR WINDOW WHICH OPENS ON AN AUTOMOTIVE VEHICLE

BACKGROUND OF THE INVENTION

1. Field of the Invention

This invention relates to a device for controlling the operation of an electric motor driving a windshield wiper arm and a control process utilized by the device, and the like.

2. Description of the Prior Art

The control device according to the invention can be utilized to control the operation of an electric motor driving the windshield wiper arm of an opening window, particularly the rear opening window of an automotive vehicle.

The state of the art already mentions a certain number of control devices of this type which comprise a unit controlling the power to the motor whose operation is controlled by the vehicle key contact and an element controlling the operation of the motor, the key and controlling element being under user control and connected in series between the power source and the control unit.

The operation of the control unit is also controlled by means for detecting the open or closed position of the glass pane, utilized as safety elements, these means of detection being for example a contact inserted in a control unit supply line to cut the power supply to this control unit and therefore to the motor when the user opens the corresponding window while the windshield wiper assembly is running.

The opening or closing of this contact interposed in the supply line of the control unit establishes predetermined operation, i.e. a stop or a resumption of the windshield wiper action.

However, this structure involves a certain number of disadvantages, for only a simple operation of the windshield wiper assembly, when the window is opened or closed, can be performed economically.

Moreover, when the window is closed, the windshield wiper assembly restarts automatically, which may also present a danger for the user.

SUMMARY OF THE INVENTION

This invention aims at resolving these problems by proposing a control device which is simple and reliable.

To this end, the invention proposes a device to control the operation of an electric driving motor for the windshield wiper arm of an opening rear window in an automotive vehicle. A control unit is provided for the power supply to the motor. The operation of the motor, moreover, is controlled by a vehicle key contact and a motor operation control element. The key contact and the control element are under user control and are connected in series between a source of power, or power supply, the control unit, and a contact that detects the opening or closing of the window. The invention is characterized in that the detection contact is connected to a data input terminal for the control unit, and in that the latter is intended to command a restarting of the motor, after the window is opened and closed, and only after reinitialization by switching off the control element and by a new action of the user in manipulating the control element.

According to one aspect of the invention, a power supply terminal of the unit is connected to the midpoint between the key contact and the control element.

According to another aspect of the invention, the control unit comprises two sub-modules, the first of which receives at one of its inputs a signal that signals any opening of the window (the so-called "open window signal"). It also comprises, in addition, a logical OR gate and trips to generate a signal that maintains inhibition of the motor supply until the reinitialization has occurred.

The second module controls the supply to the motor in response to the input signals and receives at its inputs the open window signal and the signal that maintains the inhibition.

According to one method accomplished through this invention, the supply to the motor is inhibited from the moment the open window signal is received.

According to another method accomplished through this invention, after receiving the inhibition signal the supply to the motor is inhibited only after the windshield wiper arm has been returned to a predetermined position.

Other characteristics and advantages of the invention will appear from reading the detailed description given below, for the understanding of which reference will be made to the attached drawings.

DESCRIPTION OF THE PREFERRED EMBODIMENT(S)

Figure 1:
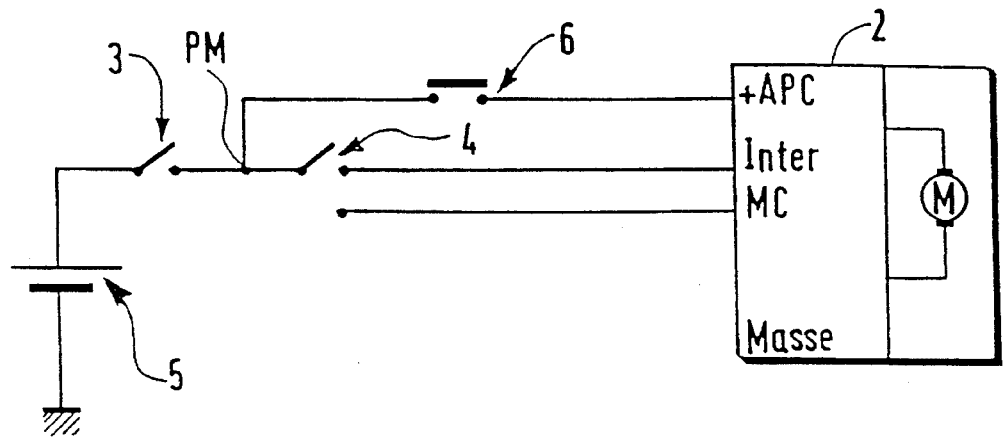
FIG. 1 is a block diagram of a prior art control device.

As seen in FIG. 1, a control device is designed to control the operation of an electric motor M driving a windshield wiper arm (not shown) of an opening rear window (also not shown) of an automotive vehicle.

This device comprises a unit 2 that controls the supply to this motor whose operation is controlled by a key contact 3 of the vehicle and an element 4, which is under user control, that controls the operation of the motor.

The key contact 3 and the control element 4 are connected in series between a power supply 5 and the control unit 2.

The control element 4 can be an element with multiple controls serving, for example, to control the intermittent or continuous operation of the motor.

Furthermore, the operation of this control unit 2, and therefore of the motor M, also is controlled through a contact that detects the opening or closing of the window.

This detecting contact is designated by reference numeral 6 in FIG. 1. The detecting contact 6 is interposed in the supply line of the control unit 2 and is connected to midpoint PM between the key contact 3 of the vehicle and the control element 4.

As previously indicated, this device involves a certain number of disadvantages in that the detecting contact 6 that registers the opening or closing of the window is interposed in the supply line to the control unit. This combination causes the motor M to automatically stop and restart following the opening and closing of the window.

Figure 2:
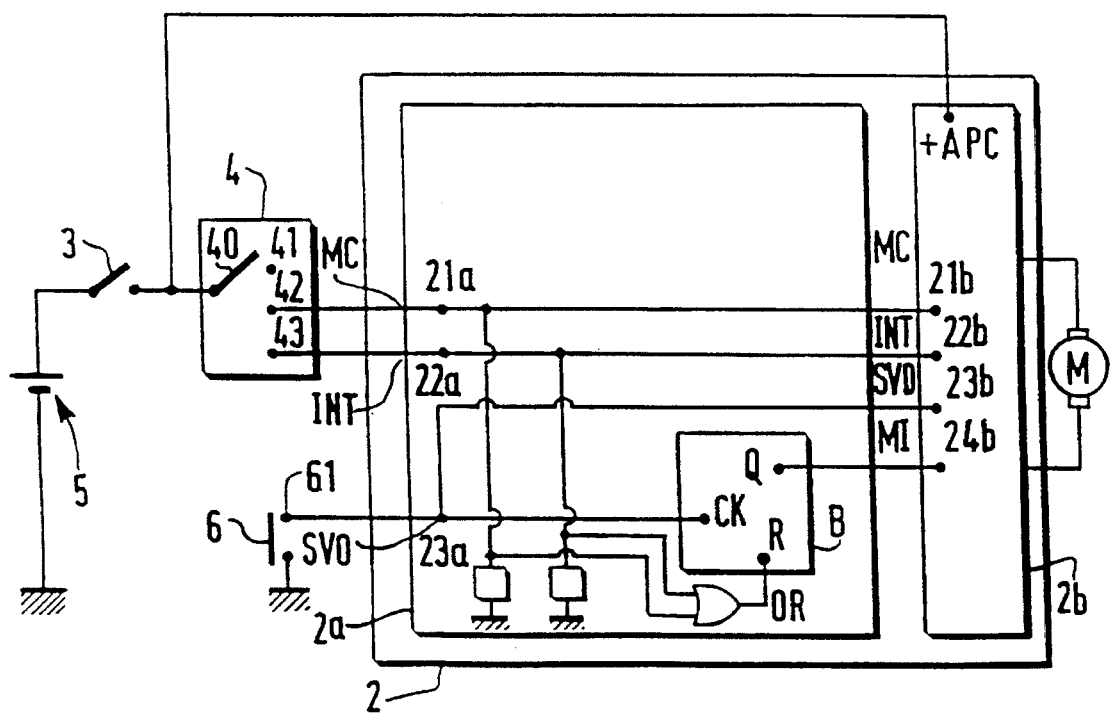
FIG. 2 is a diagram of a control device according to the invention.

FIG. 2 represents a control device according to the invention which makes it possible to resolve these problems. Similar elements in FIG. 1, moreover, are designated by the same reference numerals in FIG. 2.

As can be seen in FIG. 2, the control element 4, under user control, has a control contact 40 with three possible contact points 41, 42, 43.

The control unit 2 is composed of two modules 2a and 2b. The module 2 a has three inputs 21a, 22a, 23a and four outputs that are connected to the inputs 21b, 22b, 23b, 24b of the module 2b which controls the power to the motor M in response to the applied input signal in addition to the inputs 21b, 22b, 23b, 24b.

The contact points 42, 43 of element 4 are connected respectively to the inputs 21a, 22a of the module 2a and to the inputs 21b and 22b of the module 2b. The signals applied to the contact point 42 and the inputs 21a, 21b and to the contact point 43 and the inputs 22a, 22b are, respectively, MC (continuous operation) and INT (intermittent).

The inputs 23a and 23b are connected to the terminal 61 of the detecting contact 6. In this circumstances, the signal that is applied to the terminal 61 and the inputs 23a and 23b is SVO (window open signal).

The signals MC, INT, SVO each have two possible logical levels, logical level "1" and logical level "0".

MC is at level "1" when the contact 40 engages the point 42.

Comparably, INT is at "1" when the contact 40 engages the point 43.

SVO is a signal at level "0" when the detecting contact 6 registers an opening of the window on which the windshield wiper arm is located, and is at level "1" when the window is closed.

The inputs 21a, 22a are connected to the two inputs of a logical OR gate, an element of module 2a that is designated by OR in FIG. 2.

The output of the OR gate is connected to the reset input R of a rocker arm B in module 2A, which has an SVO signal applied to its "clock" input CK. The rocker arm B comprises, in addition, an output Q that is connected to the input 24b of the module 2b, in order to deliver a signal MI (Maintenance of Inhibition).

If at the input CK the signal SVO changes from level "1" to level "0", the signal MI at the output Q passes to "1" and remains at this logical level until the input R passes to "0", it can be said that the rocker arm B has been reset.

The module 2b, a microprocessor logical unit, receives the signals MC, INT, SVO, MI, and controls the power supply to the motor M in response to the logical levels of the signals MC, INT, SVC, MI.

If the signal MC at the input 21b is at level "1", the module 2b controls the power to the motor for continuous operation.

Likewise, when the module 2b detects a level "1" for the signal INT at the input 22b, the module controls the power to the motor M for intermittent operation of the windshield wiper arm.

If the signal SVO is at level "0", the module 2b thus receives the order to inhibit power to the motor M. After having received the signal SVO, the module 2b may order inhibition of the motor M when the windshield wiper arm has eventually been returned to a predetermined position. This will be explained later in detail.

On the other hand, when the signal SVO again trips to level "1" thus signaling the closing of the window, the module 2b responds to the signal MI which continues to inhibit the motor after the window is closed. As long as the signal MI is at level "1", the module 2b maintains inhibition of the motor power supply.

Figure 3A:
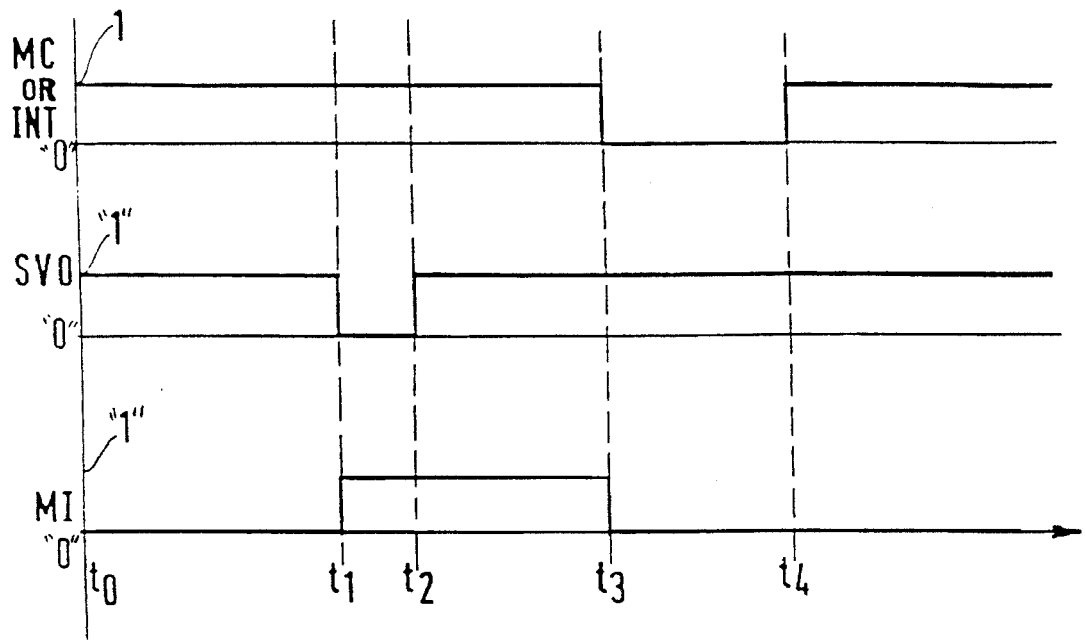
FIG. 3a, 3b, and 3c are time diagrams that illustrate the operation of the control unit.
Figure 3B:
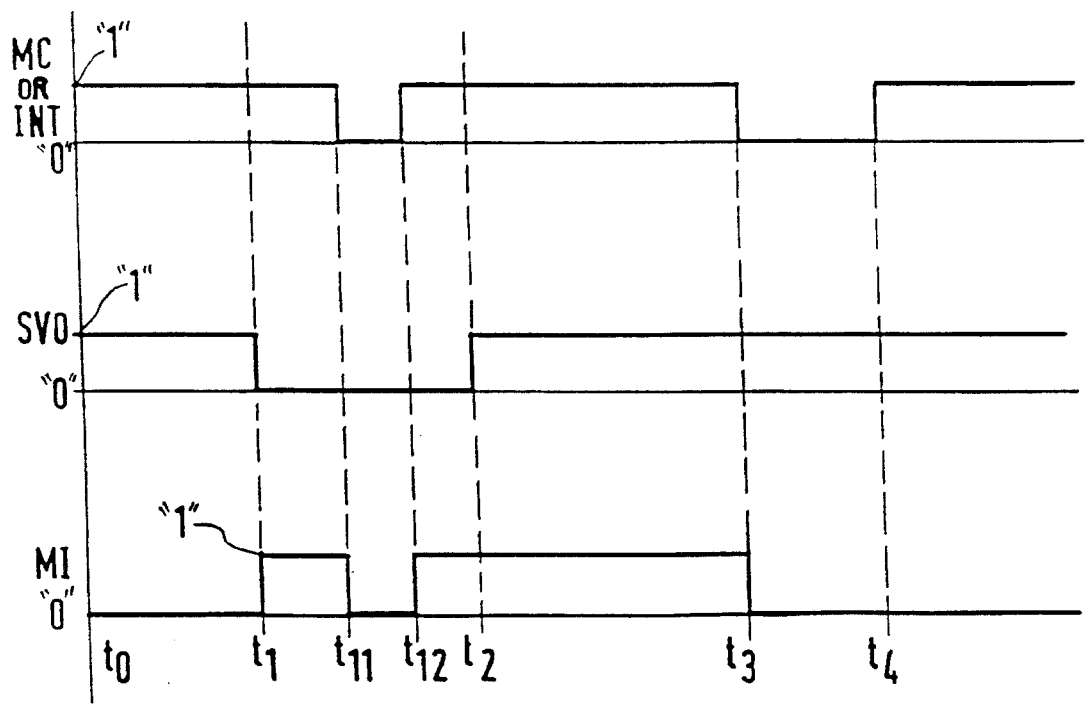
Figure 3C:
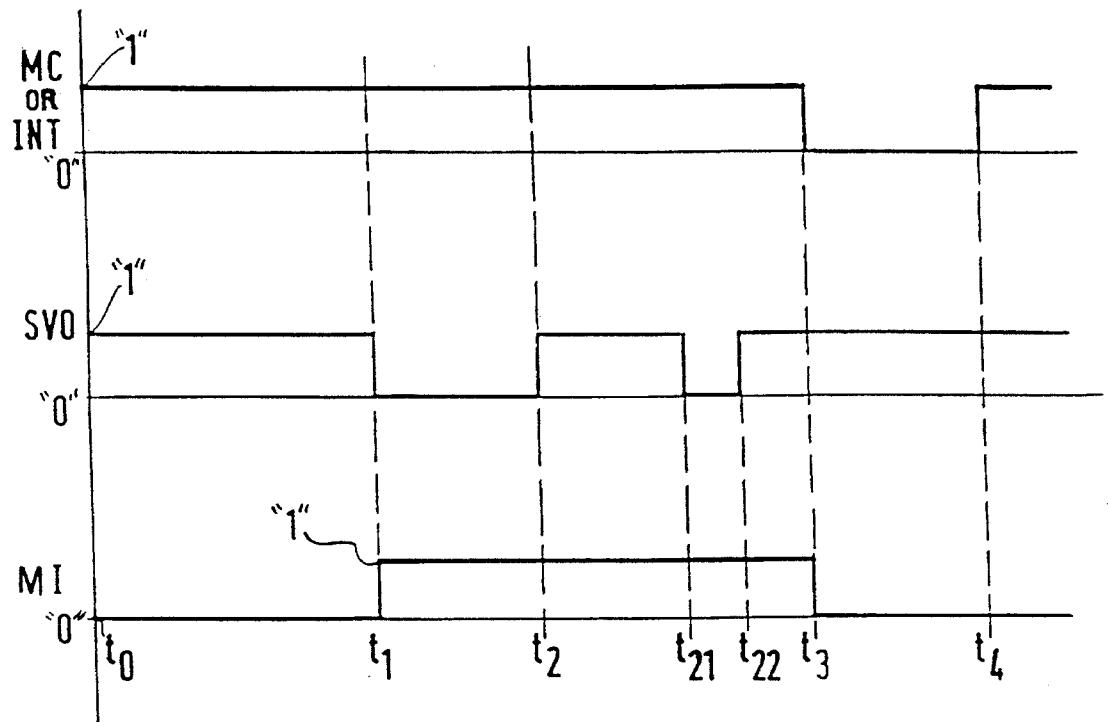

An explanation is now given, in reference to FIGS. 3a, 3b, 3c, of the operation of the module 2a that controls the module 2b.

In order to simplify the following explanation, the specific case in which the contact key 3 (FIG. 2) remains closed is assumed.

Otherwise, the operation of the motor M can be continuous or intermittent. Thereafter the choice will be for continuous operation.

Referring first of all to FIG. 3a, at the instant $t_o$, the signal MC is at level "1", SVO is at "1" signaling the closed position of the window, hence MI remains at "0".

This state lasts until the instant $t_1$ when the contact 6 detects the opening of the window and the signal SVO trips to level "0", thus causing the signal MI to pass to "1". The signal SVO at level "0" gives the command to the module 2b to inhibit the power supply to the Motor M.

At the instant $t_2$ the window is reclosed, SVO returns to level "1". However, it is noted that the signal MI remains at level "1", thus requiring the module 2b to maintain inhibition of the motor M after $t_2$. In order for MI to return to level "0" thus ending the inhibition, the rocker arm B must be reset. This is possible only when the two inputs of the OR gate whose output is connected to the input R that resets the rocker arm B return to "0".

Consequently, the user must decide to switch off the control element 4 by putting it in the off position, i.e., place the contact 40 on point 41. In fact, at the instant $t_3$ the signal MC goes to "0", causing the resetting of output Q of the rocker arm B, which converts the signal MI to level After the instant $t_3$, the off position of the control element 4 causes the entire control unit 2 to stop.

At the instant $t_4$, the user decides to put the windshield wiper device back in continuous operation; he places the contact 40 on point 42 and the signal MC goes back to "1".

In other words, the detection contact 6 is connected to the input 22a of the module 2a so that this input can command a restart of the motor M, after the window has been opened and closed, only after reinitialization by switching off the control element 4 and by the user acting again on the control element 4.

In fact, the control 2 does not cause an automatic restarting of the windshield wiper arm driving motor when the window is being closed, but waits for a reinitialization as the user switches off the control element 4.

The user may then trigger a new operating cycle of this motor and therefore of the windshield wiper arm by acting again on the control element 4.

This action of the user on the control element 4, after the window has been opened and closed, to command a restarting of the motor M, is a safety measure aimed at preventing any risk of accident possibly due to a systematic restarting, after the window has been closed, of the motor M that drives the windshield wiper arm.

The time diagrams of FIG. 3b represent another case in which the control element 4 is placed in the off position, contact 40 on point 41, by the user while the window remains open. This event takes place during the interval VO (window open) defined by $t_1$ and $t_2$. In FIG. 3b, $t_o$, $t_1$, $t_2$ mark the same events as in FIG. 3a.

At the instant $t_1$, the window is opened and SVO passes to level "0", causing the signal MI to go to "1". Hence module 2b orders inhibition of the power supply to the motor M. At the instant $t_{11}$, located in the interval VO when the window is open, the user positions the control element 4 in its off position, the signal MC thus returns to level "0", leading to a resetting of the rocker arm B and the signal MI goes to level "0". However, the module continues to maintain inhibition of the power supply to the motor for SVO is always at "0".

At instant $t_{12}$, the user positions the control element 4 on MC, contact 40 on point 42, MC returns to level "1" thus causing the passage of MI to "1" which remains in the same state until $t_2$. Between $t_{12}$ and $t_2$ the motor M is inhibited under same conditions as between $t_1$ and $t_{11}$.

After instant $t_2$, the situation is the same as in the case represented in FIG. 3a after $t_2$.

The time diagrams in FIG. 3c refer to another case in which the event under consideration occurs in the interval defined by $t_2$ and $t_3$.

At the instant $t_2$, MC is still at "1" the window is reclosed, but the signal MI being at "1" the power supply to the motor M remains inhibited.

At the instant $t_{21}$, while the signals MC, MI remain in a state identical to instant $t_2$, the window opens again and SVO returns to "0". However the signal MI remains at "1" for there is no resetting of the rocker arm B.

At the instant $t_{22}$ the window is reclosed but it has no influence of the signal MI which thus order the module 2b to maintain inhibition.

This event at instants $t_{21}$ and $t_{22}$ has no consequence on the inhibition of the power supply to the motor M.

In other words, when normal operation characterized by the starting on the control element 4 on point 42 or 43, while the window is closed, is interrupted by the first opening of the window, the power supply to the motor M is inhibited as long as the window remains open and regardless of the action by the user on the control element 4. In contrast, when this period of opening of the window is ended by the closing of the window, the inhibition is maintained until there is reinitialization by switching off of the control element 4 and restarting of the control element 4 by the user, and this regardless of the user's action on the window.

Thus, in order to inhibit the power supply to the motor M, the module 2b queries the signal SVO; on the other hand, to put an end to this inhibition, the module 2b relies on the signal MI.

When the window is opened, the module 2b receiving the order to inhibit the power supply to the motor M given by the signal SVO, is apt eventually to return the windshield wiper arm to a position chosen before inhibiting the power supply to the motor M.

Three possible variants may be envisioned concerning the position of the windshield wiper arm after the opening of the window is detected.

The first variant may consist in leaving the windshield wiper arm in its position during its travel, as the window is opened.

It is said that the windshield wiper arm stops in position.

The second variant may consist in bringing the windshield wiper arm back to its fixed stopping position located at one end of its run, before inhibiting the power supply to the motor.

One may choose to return the windshield wiper arm to its parking position against the window or off the window before inhibiting the power supply; this constitutes a third variant.

Figure 4:
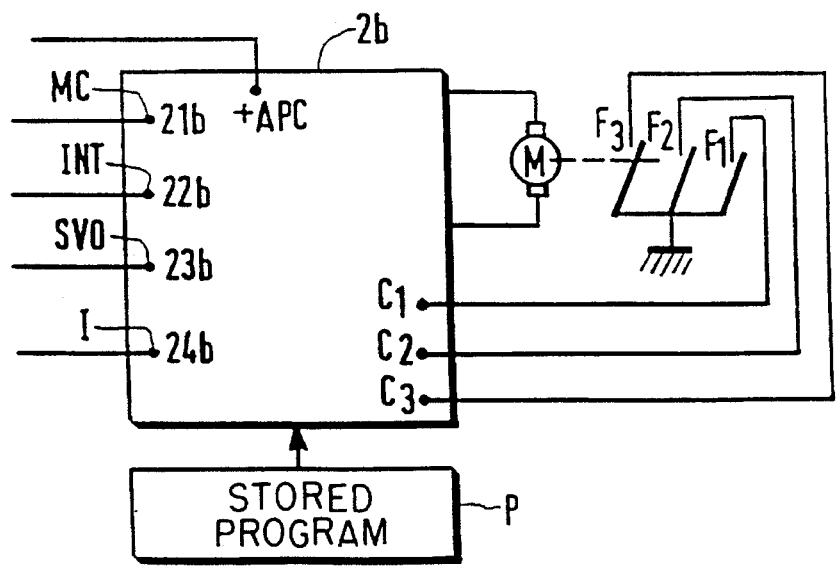
FIG. 4 is a diagram of a logical module of the control unit.

FIG. 4, representing the module 2b, enriched with respect to FIG. 2, serves to illustrate the processes to be followed to obtain one of the three variants mentioned above with the same module 2b.

It must be noted that a sweeping cycle of the windshield wiper arm consists of a to and fro movement between the two extreme positions, one called fixed stop position and the other opposite the fixed stop position. A sweeping cycle begins from the fixed stop position.

As can be seen in FIG. 4, the logical module 2b also comprises other inputs, C1, C2, C3, which are connected to three means of detection of the windshield wiper arm's position, called followers F1, F2, F3.

F1 is a follower serving to detect the position of the windshield wiper arm when it arrives at the fixed stop position. F2 serves to detect the position of the windshield wiper arm in the position opposite the fixed stop. F3 serves to detect if the windshield wiper arm has returned to its parking position located beneath the fixed stop position, thus requiring extra travel beyond the fixed stop position. In the event the windshield wiper arm is in one of the three positions, fixed stop, opposite the fixed stop or parking position, the corresponding follower sends a signal having a logical level "1" at the input C1, C2, C3 to which it is connected. If the three followers F1, F2, F3 simultaneously send signals to "0" this means that the windshield wiper arm is in an intermediate position between the two extremities that limit the travel of the arm.

The module 2b is a logical unit comprising microprocessors which can be driven by a program, which is a sequence of instructions translating one of the three processes serving to execute one of the three variants mentioned above.

The first variant consisting in leaving the windshield wiper arm in position. This variant does not require maintaining the power to the motor M after having received the inhibition command given by SVO. In this specific case, the program P requires no data at the inputs C1, C2, C3; it may decide to inhibit the power supply to the motor as soon as the signal SVO corresponds to "0" i.e., as soon as the window open signal is received.

As concerns the second and third variants, the arm in program P needs to know the current position of the order to return it, if necessary, to a predetermined position before inhibiting the power supply to the motor M.

In the case of the second variant, in which the arm must be returned to its fixed stop position, if the signal at the input C1 is at level "1" this means that the arm, at the instant of opening, is already in the fixed stop and P can give the command for an almost immediate inhibition of the power supply to the motor M.

In the opposite case, the power supply to the motor M is maintained until the arm is brought back to its fixed position. Two possibilities can be considered.

The first consists in interrupting the sweeping cycle and the program P immediately commands a sweep in the direction opposite the one operating at the moment the window is opened, in order to return the arm to its fixed stop position.

The program inhibits the power supply only if it detects a signal "1" at the input C1.

The second possibility consists, on the contrary, in terminating the sweeping cycle, passing eventually through the position opposite the fixed stop and eventually returning to the fixed stop position.

Likewise, the program P controls inhibition of the power supply only upon receipt of a signal to "1" at the input C1.

To execute the third variant, the program P queries in particular the signal at the input C3.

At the moment P receives the data on inhibition given by the signal SVO, if the signal at the input C3 is "1", P can command the immediate interruption of the power supply to the motor. If not, P has two possibilities similar to the case of the second variant to return the arm to the parking position before inhibition of the power supply.

The first consists in interrupting the sweeping cycle, to return to the fixed stop position and to travel beyond the fixed stop position in order to achieve the parking position.

The second consists in terminating the sweeping cycle. As soon as the arm returns to the fixed stop position, a travel beyond this point will return it to the parking position.

The invention claimed is:

1. A device for controlling the operation of an electric motor driving the arm of a windshield wiper for an opening window of an automotive vehicle, of the type comprising a power supply, a control element for selectively activating and deactivating the operation of the motor through deactivating the motor and subsequently activating the motor for a new use thereof, a control unit having a data input for inhibiting the power supply to the motor, a key contact for keeping the operation of the vehicle and said control element under user control, said key contact being connected in series between said power supply and said control unit, a detection contact for responding to the open and closed position of the window, said detection contact being connected to said control unit data input, said data input commanding the restarting of the motor on opening and closing of the window and only after said control element deactivation and subsequent activation of the motor for a new use thereof.

2. A device for controlling the operation of an electric motor driving the arm of a windshield wiper for an opening window of an automotive vehicle, of the type comprising a power supply, a control element for selectively activating and deactivating the operation of the motor through activating the motor and subsequently reactivating the motor for a new use thereof, a control unit having a data input for inhibiting the power supply to the motor, a key contact for keeping the operation of the vehicle and said control element under user control, said key contact being connected in series between said power supply and said control unit, a detection contact for responding to the open and closed position of the window, said detection contact being connected to said control unit data input, said data input commanding the restarting of the motor on opening and closing of the window and only after said control element deactivation and subsequent activation of the motor for a new use thereof and a power supply terminal of the unit is connected between said key contact and said control element.

3. A device as in claim 2, characterize din that the control unit comprises two submodules, the first of said modules receiving at one of its inputs an open window signal, a logical OR gate, and a rocker arm signal to maintain inhibition of the power supply to the motor until said control element reinitialization.

4. A device as in claim 3, characterized in that said second of said modules controls the power supply to the motor in response to said open window and said rocker arm signals, and in that said first module receives at one of its inputs said open window signal and said rocker arm signal to maintain inhibition of the power supply to the motor.

5. A process for controlling the operation of an electric motor for driving the arm of a windshield wiper on opening and closing the window of an automotive vehicle comprising the steps of detecting the open and closed positions of the window and generating a signal in response thereto, commanding through a control unit selective deactivation and reactivation of the motor in response to said opening and closing of the window signal only after deactivating the motor and subsequently reactivating the motor for a new use thereof and generating an inhibiting signal response thereto to selectively inhibit the supply of power to the motor whereby the power supply to the motor is inhibited as soon as the window open signal is received.

6. A process for controlling the operation of an electric motor driving the arm of a windshield wiper according to claim 5, comprising the further steps of establishing a sweeping cycle in a to and fro arm movement between two extreme positions, first at a fixed stop position and the other opposite to said fixed stop position, and a parking position that is located beyond said fixed stop position, said parking position requiring extra travel of the arm to reach said parking position, detecting the position of the arm in one of said three positions, receiving said inhibiting signal and maintaining the supply to the motor until the arm is returned to said fixed stop position as said arm is detected in said other opposite to said fixed stop position.

7. A process as in claim 6, characterized in that after receiving said open window signal, interrupting said sweeping cycle in response thereto in order to return the arm to said fixed stop position and subsequently inhibiting the power supply to the motor.

8. A process as in claim 6, characterized in that, after receiving said open window signal, said sweeping cycle continues, eventually passing through said position opposite said fixed stop and returning the arm to said fixed stop position before inhibiting the supply of the motor.

9. A process for controlling the operation of an electric motor driving the arm of a windshield wiper as in claim 6, in which said sweeping cycle has a to and fro movement between a fixed stop and a position opposite said fixed stop, said parking position being located beyond said fixed stop position, requiring extra travel of the arm to reach said parking position, detecting the position of the arm in one of said three positions and maintaining the supply to the motor to enable the motor to return the arm to the parking position upon receiving said open window signal and detecting that said arm is in said fixed stop and opposite said fixed stop position.

10. A process as in claim 9, characterized in that after receiving said open window signal, said sweeping cycle is interrupted by said open window signal to return the arm to said fixed stop position and then in further response to said open window signal to return the arm to said parking position, and subsequently inhibiting the supply to the motor.

11. A process as in claim 9, characterized in that after receiving said open window signal, continuing said sweeping cycle, passing eventually through said fixed stop position, and travelling from said fixed stop position in order to return the arm to said parking position, and then inhibiting the supply to the motor.

* * * * *